June 9, 1931.  R. M. JOHNSON  1,809,803

MACHINE FOR MANUFACTURING RUBBER BELTS

Filed July 17, 1929

Inventor
Ray M. Johnson
By R. D. Turner
Attorney

Patented June 9, 1931

1,809,803

UNITED STATES PATENT OFFICE

RAY M. JOHNSON, OF AKRON, OHIO, ASSIGNOR TO THE GOODYEAR TIRE & RUBBER COMPANY, OF AKRON, OHIO, A CORPORATION OF OHIO

MACHINE FOR MANUFACTURING RUBBER BELTS

Application filed July 17, 1929. Serial No. 378,914.

This invention relates to a machine for manufacturing rubber belts and it has particular relation to a machine for elongating the belts at one stage in their manufacture.

An object of the invention is to provide a machine for elongating rubber belts, by means of which a plurality of belts may simultaneously be elongated uniformly.

Another object of the invention is to provide a machine for elongating rubber belts which is so adjustable that belts of various lengths may be elongated and the amount of elongation varied irrespective of the length of belt.

In manufacturing small size rubber belts and particularly those of V-shape cross-section, it ordinarily is the practice so to elongate the belts prior to vulcanization that the finished belts will have little or no elastic properties. This elongation of the belts prior to vulcanization also facilitates their disposal about drums employed for vulcanizing them. Usually, the belts are built of smaller diameter than that of the drums and by means of the elongating process, the diameters of the belts are so increased that they will easily slip into position upon the drums. Prior to this invention, one apparatus employed for elongating the belts comprised an expansible drum having a cylindrical surface composed of a plurality of segments disposed in circumferentially overlapping relation. When the drum was expanded, these segments were relatively movable circumferentially. In operating such an apparatus, it was difficult to retain axially disposed ends of the segments concentric and as a result, frequently the belts were elongated to widely varying degrees. For example, one belt might be elongated three or four per cent and another belt elongated at the same time, seven or eight per cent.

This invention provides a machine for elongating a plurality of belts simultaneously in such manner that all of the belts are elongated uniformly to any degree desired. The machine comprises a pair of spaced rollers, one of which is journaled in a stationary mounting and the other of which is movable with respect to the first roller by means of a fluid operated device. Movement of the last mentioned roller is governed by stop means. The roller journaled in the stationary mounting is provided with a series of axially spaced circumferentially extending ribs between each pair of which one of the belts to be elongated is disposed. Also, this roller is provided with a sprocket wheel by means of which it is driven through the instrumentality of a chain having a driving connection with a sprocket wheel on the shaft of a motor. When the belts are disposed about the two rollers, the movable roller is moved relative to the stationary roller and simultaneously the latter is rotated. Owing to this association of the steps of operation, the belts are elongated uniformly.

For a better understanding of the invention, reference may now be had to the accompanying drawings, forming a part of the specification, in which.

Figure 1:
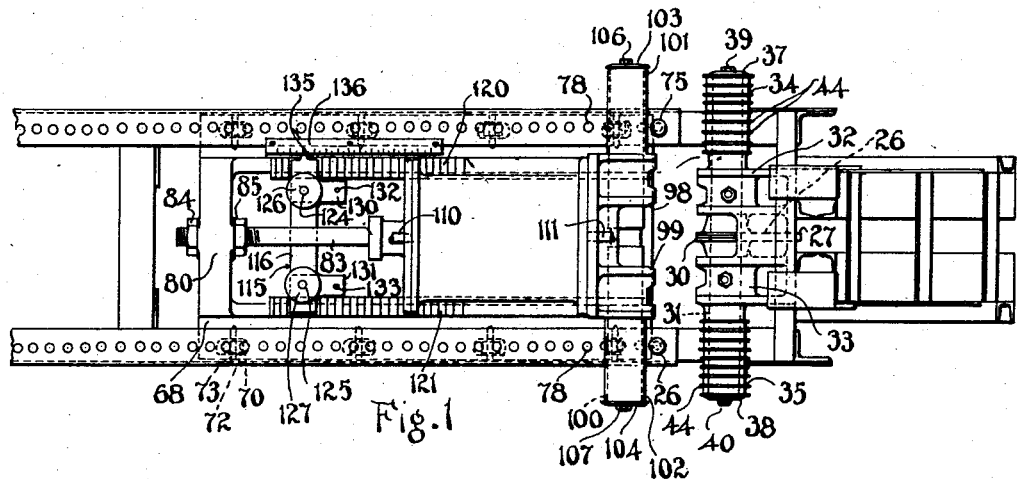
Figure 1 is a plan view of a machine constructed according to the invention.
Figure 2:
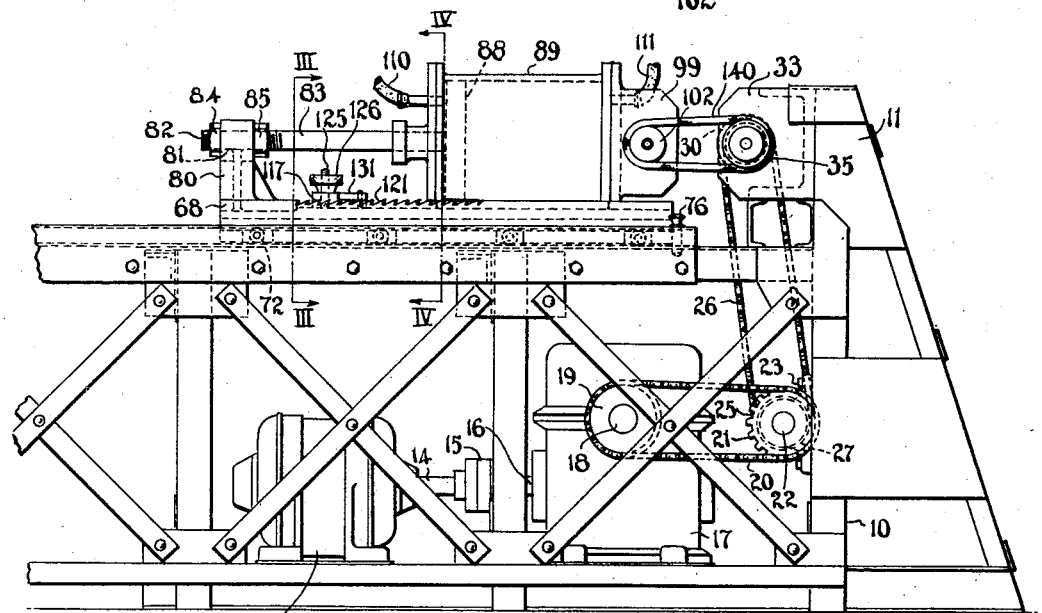
Figure 2 is a side elevational view of the machine shown by Figure 1.

Referring to Figures 1 and 2, a framework 10 is provided which at one end has a portion 11 projecting above the main body of the framework. A motor 13 mounted in the framework is provided with a shaft 14 which is coupled, as indicated at 15, to a shaft 16 forming part of a conventional reduction gearing 17. A shaft 18 forming a part of the reduction gearing is provided with a sprocket wheel 19 about which a chain 20 is trained. This chain in turn is trained about a sprocket wheel 21 rigidly secured to a shaft 22 that is journaled in a bearing 23 secured to the framework 10.

A second chain 26, trained about a sprocket wheel 27 also secured to the shaft 22, is trained about a sprocket wheel 30 rigidly secured to a roller shaft 31 journaled in bearing brackets 32 and 33 forming part of the upwardly projecting portion 11 of the framework 10. Opposite ends of the roller shaft 31 projecting from the brackets 32 and 33 are provided with sleeves 34 and 35, respectively, which are rigidly secured to the shaft. The sleeves 34 and 35 are retained on the shaft 31 by caps 37 and 38 having bolts 39 and 40 threaded into opposite ends of the shaft respectively. Each of the sleeves 34 and 35 is provided with a series of axially spaced circumferentially extending ribs 44.

Figures 3, 4:
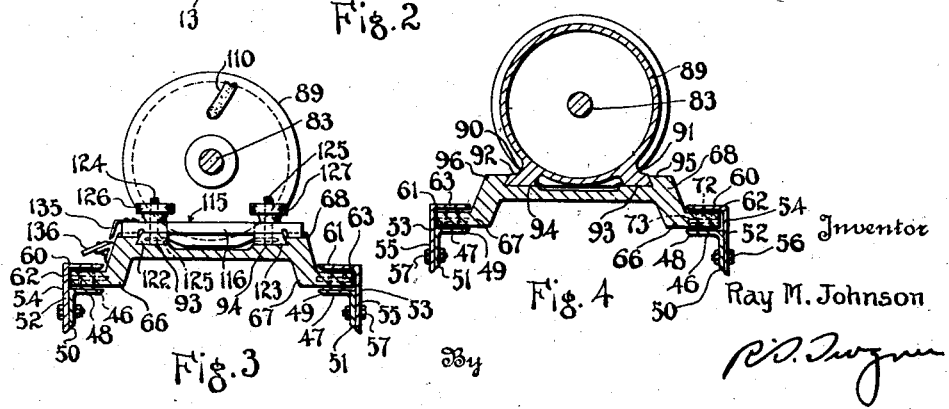
Figure 3 is a cross-sectional view taken substantially along the line III—III of Figure 2.
Figure 4 is a cross-sectional view taken substantially along the line IV—IV of Figure 2.

As best shown by Figures 3 and 4, the framework 10 is provided with a pair of spaced parallel angle bars 46 and 47 having horizontally disposed portions 48 and 49 and vertically disposed portions 50 and 51. Other angle bars 52 and 53 are provided with vertically disposed legs 54 and 55 secured to the vertical legs 50 and 51, respectively, of the angle bars 46 and 47 by means of bolts 56 and 57. The angle bars 52 and 53 are provided with horizontal legs 60 and 61 which are vertically spaced with respect to the horizontal legs 48 and 49 of the angle bars 46 and 47 respectively, thereby providing guideways 62 and 63 on opposite sides of the framework. These guideways receive edge portions 66 and 67 of a carriage 68. In order to facilitate movement of the carriage 68 in the guideways 62 and 63, edge portions 66 and 67 of the carriage are provided with spaced elongate recesses 70 (Figure 1) in which rollers 72 are journaled on pins 73.

The horizontal legs 48 and 60 of the angle bars 46 and 52 respectively are provided with a series of spaced openings 77 which are adapted selectively to receive a pin 75. Likewise, the horizontal legs 49 and 61 of the angle bars 47 and 53 are provided with a series of spaced openings 78 which are adapted selectively to receive a pin 76. These pins normally are positioned at the end of the carriage 68 adjacent the vertically projecting portion 11 of the framework 10, and provide an abutment therefor.

The opposite end of the carriage 68 is provided with an upwardly projecting bearing bracket 80 having an aperture 81 in its upper end. The threaded end 82 of a piston rod 83 projects through the opening 81 in the bracket 80 and is adjustably retained therein by lock nuts 84 and 85 threaded on the end of the piston rod on opposite sides of the bracket and in abutment therewith. The opposite end of the piston rod 83 is provided with a piston 88 which is disposed in a cylinder 89 mounted on a crosshead 90.

The crosshead 90 is provided with a pair of integral legs 91 and 92 which are slidable in guideways 93 and 94, respectively, provided in the upper surface of the carriage 68. These legs are retained in the guideways 93 and 94 by gibs 95 and 96 on opposite sides of the carriage. That end of the crosshead 90 opposite the bearing bracket 80 is provided with spaced bearing brackets 98 and 99, in which a roller shaft 100 is journaled. Opposite ends of the shaft 100 projecting from the outer sides of the bearings 98 and 99 are provided respectively with sleeves 101 and 102 retained on the shaft by caps 103 and 104 respectively. The caps are secured to the ends of the shaft 100 by machine bolts 106 and 107 extending through the caps respectively and having threaded engagement with the ends of the shaft.

Fluid under pressure may be admitted to opposite ends of the cylinder 89 and likewise discharged from such ends by means of conduits 110 and 111 which communicate with a suitable four way valve (not shown). It is apparent that when fluid under pressure is admitted into the cylinder 89 through the conduit 110 that the crosshead 90 and the cylinder 89 will be moved toward the bearing bracket 80 instead of the piston 88 being moved by the fluid, because the carriage 68, and hence the piston 88, are retained stationary by the abutment of the carriage against the pins 75 and 76. Movement of the crosshead 90 may be adjustably limited by means of a stop 115 that comprises a bar 116 having the lower surfaces of its end portions serrated, as indicated at 117. The serrated portions of the bar are adapted to cooperate respectively with serrated faces 120 and 121 formed on the upper face of the carriage 68 adjacent the guideways 93 and 94, respectively.

The bar 116 is adjustably secured to a pair of slidable blocks 122 and 123 disposed in the guideways 93 and 94 respectively, by means of stud bolts 124 and 125 threaded into such blocks and projecting upwardly through the ends of the bar. Thumb nuts 126 and 127 threaded on the outer ends of the bolts 124 and 125 retain the bar 116 in rigid relation with the blocks. In order further to increase the rigidity of the bar 116 and the blocks 122 and 123, thus assembled, the bar is provided with legs 130 and 131 which also are connected to the blocks 122 and 123 by means of dowel pins 132 and 133 projecting upwardly from the blocks and engaging such legs. The desired position of the bar 116 relative to the carriage 68 may readily be determined by means of a pointer 135 secured to the bar 116, which is disposed above a scale 136 secured to the carriage 68.

In operation of the above described mechanism, the pins 75 and 76 are disposed in certain of the openings 77 and 78 respectively, depending upon the length of the belts to be elongated, and a plurality of V-belts, such as those indicated at 140, are disposed about the sleeves 34 and 101 and the sleeves 35 and 102, in such manner that each belt is disposed between two of the ribs 44 on the sleeves 34 and 35. The stop 115 then may be adjusted along the serrated portions 120 and 121 of the carriage 68 to a position predetermined by the amount of elongation desired in the belts. Then the motor 30 is energized which results in the sleeves 34 and 35 being rotated and consequently the belts 140 being driven around the sleeves with which they are engaged. Thereafter, fluid under pressure is admitted into the cylinder 89 through the conduit 110 and by reason of the carriage 68 having an abutting relation with the pins 75 and 76, the crosshead 90 is moved in a direction toward the bearing bracket 80. This action results in an elongation of the belts 140 simultaneously during their movement about the sleeves with which they are engaged. Elongation of the belts is terminated by engagement of the legs 91 and 92 on the cylinder with the legs 130 and 131 on the stop 115. After the belts 140 are thus elongated, fluid is admitted into the cylinder through the conduit 111 which results in a movement of the crosshead 90 to its initial position. Then the belts are removed from the machine.

It is apparent from the foregoing description that a series of belts may be simultaneously and uniformly elongated predetermined amounts by means of a machine provided and constructed according to this invention. Also, it is apparent that various sizes of belts may be elongated and that any size of belt may be elongated a predetermined degree, because of the adjustability of the several elements comprising the machine. Belts so elongated in practice operate very efficiently, particularly where a series of belts constitute a single drive and it is essential that each belt bear its share of the load.

Although I have illustrated only the preferred form of the invention and have described that form in detail, it will be apparent to those skilled in the art that the invention is not so limited, but that various modifications may be made therein without departing from the spirit of the invention or from the scope of the appended claims.

What I claim is:

1. A machine for stretching endless belts comprising a frame, a pair of spaced relatively adjustable belt retaining rollers, a cylinder slidably mounted on the frame and secured to one of the rollers, a piston within the cylinder and having a rod projecting from one end thereof, said rod being adjustably connected to the frame, means for supplying fluid under pressure to the cylinder, and means for rotating one of the rollers.

2. A machine for stretching endless belts comprising a frame, a pair of spaced relatively adjustable belt retaining rollers, a cylinder slidably mounted on the frame and secured to one of the rollers, a piston within the cylinder and having a rod projecting from one end thereof, said rod being adjustably connected to the frame, means for supplying fluid under pressure to the cylinder, means for rotating one of the rollers, and an adjustable stop for limiting the movement of the cylinder.

3. A machine for stretching endless belts comprising a frame, a pair of spaced relatively adjustable belt retaining rollers on the frame, fluid operated means for adjusting the rollers, means for rotating one of them, and adjustable means for limiting the relative movement of the rollers by the fluid operated means.

4. A machine for stretching endless belts comprising a frame, a guideway on the frame, a carriage adjustably mounted in the guideway, said carriage also having a guideway, a crosshead slidably mounted in the second guideway, and including a cylinder having a piston rod secured to the carriage, a belt retaining roller journaled in the crosshead, a second belt retaining roller journaled in the frame adjacent the crosshead, and means for rotating one of the rollers.

5. A machine for stretching endless belts comprising a frame, a guideway on the frame, a carriage adjustably mounted in the guideway, said carriage also having a guideway, a crosshead slidably mounted in the second guideway, and including a cylinder having a piston rod adjustably secured to the carriage, a belt retaining roller journaled in the crosshead, a second belt retaining roller journaled in the frame adjacent the crosshead, and means for rotating one of the rollers.

6. A machine for stretching endless belts comprising a frame, a guideway on the frame, a carriage adjustably mounted in the guideway, said carriage also having a guideway, a crosshead slidably mounted in the second guideway, and including a cylinder having a piston rod secured to the carriage, a belt retaining roller journaled in the crosshead, a second belt retaining roller journaled in the frame adjacent the crosshead, and means for rotating the last mentioned roller.

7. A machine for stretching endless belts comprising a frame, a guideway on the frame, a carriage adjustably mounted in the guideway, said carriage also having a guideway, a crosshead slidably mounted in the second guideway, and including a cylinder having a piston rod secured to the carriage, a belt retaining roller journaled in the crosshead, a second belt retaining roller journaled in the frame adjacent the crosshead and having axially spaced circumferentially extending ribs on its outer surface.

8. In combination, a frame, a guideway on the frame, a carriage adjustably mounted in the guideway, said carriage also having a guideway, a crosshead slidably mounted in the second guideway and including a cylinder having a piston rod secured to the carriage, a belt retaining roller journaled in the crosshead, a second belt retaining roller journaled in the frame adjacent the crosshead, and adjustable means for limiting the movement of the crosshead.

9. In combination, a frame, a guideway on the frame, a carriage adjustably mounted in the guideway, said carriage also having a guideway, a crosshead slidably mounted in the second guideway and including a cylinder having a piston rod secured to the carriage, a belt retaining roller journaled in the crosshead, a belt retaining second roller journaled in the frame adjacent the crosshead, and a scale on the carriage for facilitating adjustment of the last crosshead relative to the carriage.

10. In combination, a frame, a pair of belt retaining rollers mounted on the frame in parallel spaced relation, one of said rollers being journaled intermediate its ends in the frame, the other roller being journaled intermediate its ends in a crosshead movably mounted on the frame, means for moving the crosshead on the frame, and means for driving one of the rollers.

In witness whereof, I have hereunto signed my name.

Signed at Akron, in the county of Summit and State of Ohio, U. S. A., this 16th day of July, 1929.

RAY M. JOHNSON.